US008494911B2

(12) United States Patent
White et al.

(10) Patent No.: US 8,494,911 B2
(45) Date of Patent: Jul. 23, 2013

(54) DASHBOARD MAINTENANCE/OUTAGE CORRELATION

(75) Inventors: Chris L. White, Plano, TX (US); Evan Pedersen, Colorado Springs, CO (US); Edmund G. Dombrowski, Hamilton, VA (US); Eric S. Derose, Fairfax, VA (US); David J. Vohsman, Manitou Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1554 days.

(21) Appl. No.: 11/771,365

(22) Filed: Jun. 29, 2007

(65) Prior Publication Data

US 2009/0007145 A1    Jan. 1, 2009

(51) Int. Cl.
*G06Q 30/00* (2012.01)

(52) U.S. Cl.
USPC ..................................... 705/26.1; 340/539.2

(58) Field of Classification Search
USPC ............... 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2; 340/539.2
See application file for complete search history.

(56) References Cited

U.S. PATENT DOCUMENTS

| | | | |
|---|---|---|---|
| 6,292,806 B1 * | 9/2001 | Sandifer | 705/26.1 |
| 6,732,195 B1 * | 5/2004 | Baldwin | 710/6 |
| 7,167,094 B2 * | 1/2007 | Ciarcia et al. | 340/568.1 |
| 7,945,385 B2 * | 5/2011 | Villalobos et al. | 701/454 |
| 8,095,306 B2 * | 1/2012 | Villalobos et al. | 701/532 |
| 2002/0054101 A1 * | 5/2002 | Beatty | 345/764 |
| 2003/0191752 A1 * | 10/2003 | Fairweather | 707/3 |
| 2006/0229928 A1 * | 10/2006 | Nix, Jr. | 705/9 |
| 2008/0030322 A1 * | 2/2008 | Stauffer et al. | 340/539.2 |
| 2008/0157943 A1 * | 7/2008 | Rennie et al. | 340/426.16 |

OTHER PUBLICATIONS

Kevin Xiaoguo Zhu "Sensor-based Condition Monitoring and Predictive Maintenance—An Integrated Intelligent Management Support System" Intelligent Systems in Accounting, Finance and Management, vol. 5: 241-258 (1996).*

* cited by examiner

*Primary Examiner* — Naeem Haq

(57) ABSTRACT

A device receives multiple products associated with a customer of a network and provided by the network, matches the multiple products with multiple maintenance events, and displays multiple visual indicators indicating status of the multiple maintenance events.

23 Claims, 14 Drawing Sheets

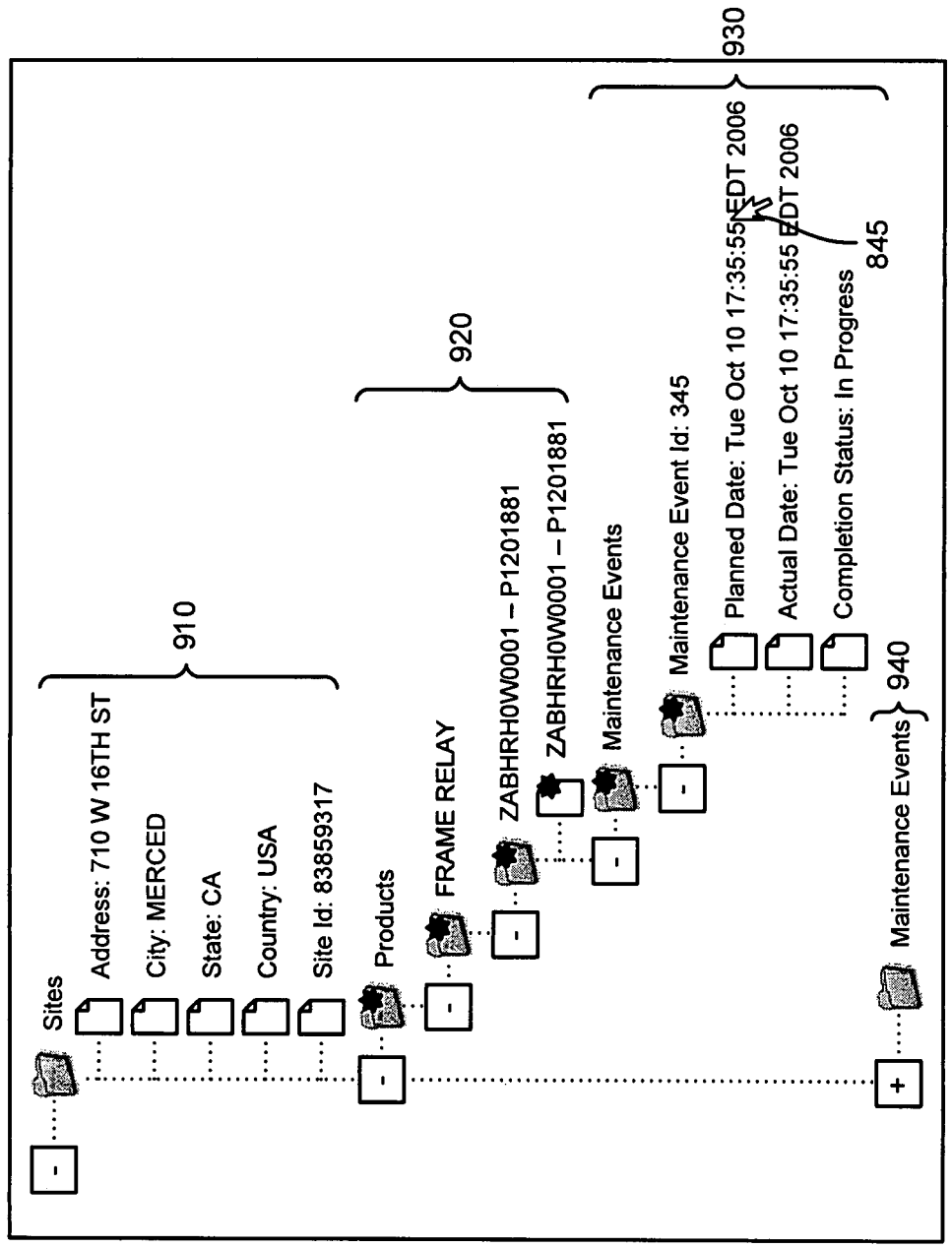

FIG. 10

| | |
|---|---|
| Event Id: | 345 |
| Request Id: | --- |
| Submit Date: | 10/10/2006 17:40 |
| Approval Status: | approved |
| Event Code Description: | na |
| Completion Status: | IN_PROGRESS |
| Planned Start | 10/10/2006 17:40 |
| Actual Start | 10/10/2006 17:40 |
| Actual Stop: | 10/10/2006 17:40 |

Event Id, Request Id, Submit Date, Approval Status } 1010

Event Code Description, Completion Status, Planned Start, Actual Start, Actual Stop } 1020

Item Id: ---

| | |
|---|---|
| Location: | dallas |
| Impact Type: | 1 |
| Number of Outages: | 3 |
| Duration: | approved |
| Validation Status: | ZD01 |
| Equipment Type: | ... |
| Circuit Type: | ZDFG57758 |
| Circuit Id: | 117772 |
| Ticket | na |
| Event Summary: | |

} 1030

1000

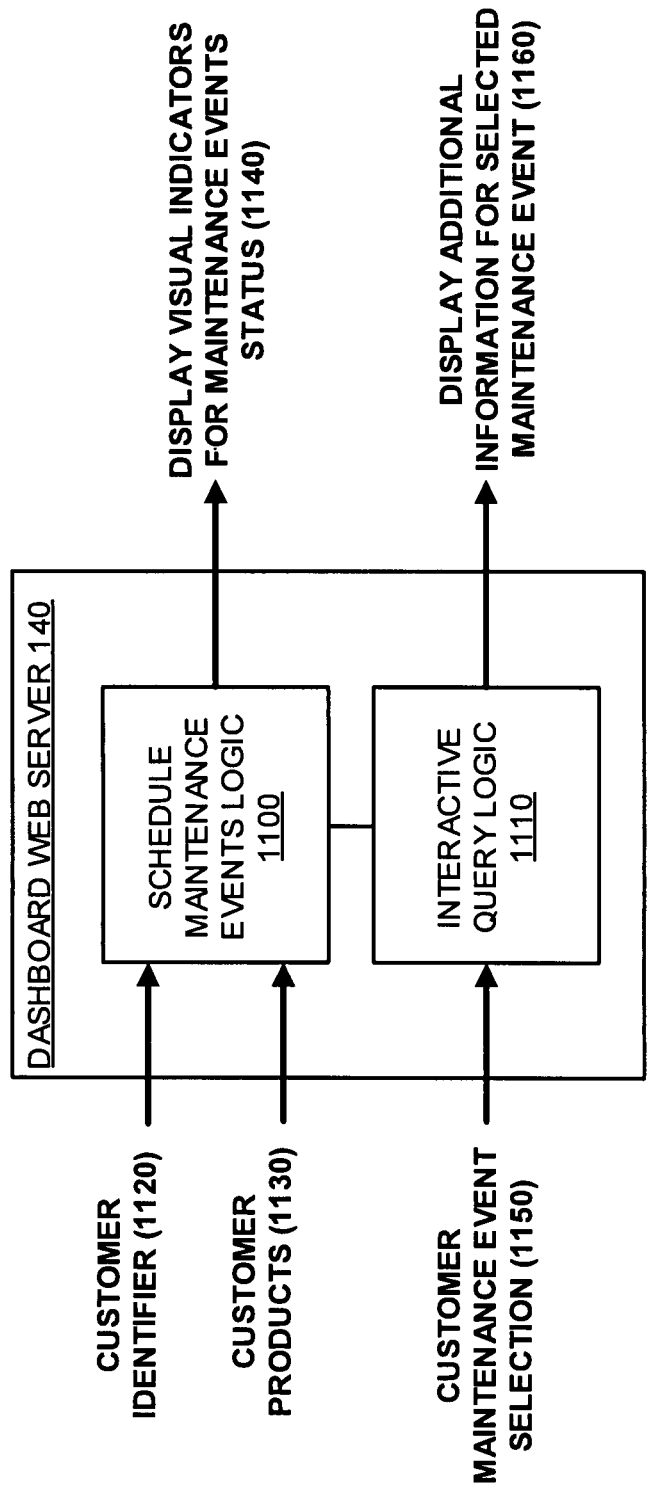

DASHBOARD MAINTENANCE/OUTAGE CORRELATION

BACKGROUND

Large customers of network services may subscribe to different networks that include various types of inventory (e.g., circuits, devices, etc.). For example, a customer may subscribe to a private Internet Protocol (IP) network that provides private (e.g., secure) network services to the customer. The private IP network may include an inventory (e.g., circuits, devices, etc.) that may be provided throughout various locations (e.g., throughout various states, regions, countries, etc.). Portions of the inventory may require maintenance (e.g., a circuit may generate an alarm indicating a problem), and tickets may be generated, by a customer, to address any alarms and/or maintenance events. For example, a ticket may request that the network provider investigate an alarm generated by a circuit.

BRIEF DESCRIPTION OF THE DRAWINGS

FIG. 9 is a diagram of an exemplary user interface that depicts information associated with a maintenance event selected from the dashboard inventory map of FIGS. 8A and 8B;

FIG. 10 is a diagram of an exemplary user interface that depicts information associated with a selected maintenance event of FIG. 9;

FIG. 11 is a diagram depicting exemplary functions capable of being performed by the dashboard web server of FIG. 1;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and methods that provide a dashboard page for presentation and/or mapping of a customer's inventory and any alarms, tickets, and/or maintenance events associated with the customer's inventory. For example, in one implementation, the systems and methods may provide a dashboard maintenance/outage correlation that correlates one or more customer products (e.g., inventory, tickets, alarms, etc.) in real time for one or more maintenance events, and/or displays one or more visual indicators for the one or more maintenance events. The dashboard maintenance/outage correlation may receive a customer selection of a maintenance event, and/or may display additional information associated with the selected maintenance event.

A "page," as the term is used herein, is to be broadly interpreted to include any machine-readable and machine-storable work product. A page may include, for example, an e-mail, a web site, a file, a combination of files, one or more files with embedded links to other files, a news group posting, any of the aforementioned, etc. In the context of the Internet, a common document is a web page. Documents often include textual information and may include embedded information (such as meta information, images, hyperlinks, etc.) and/or embedded instructions (such as Javascript, etc.).

Figure 1:
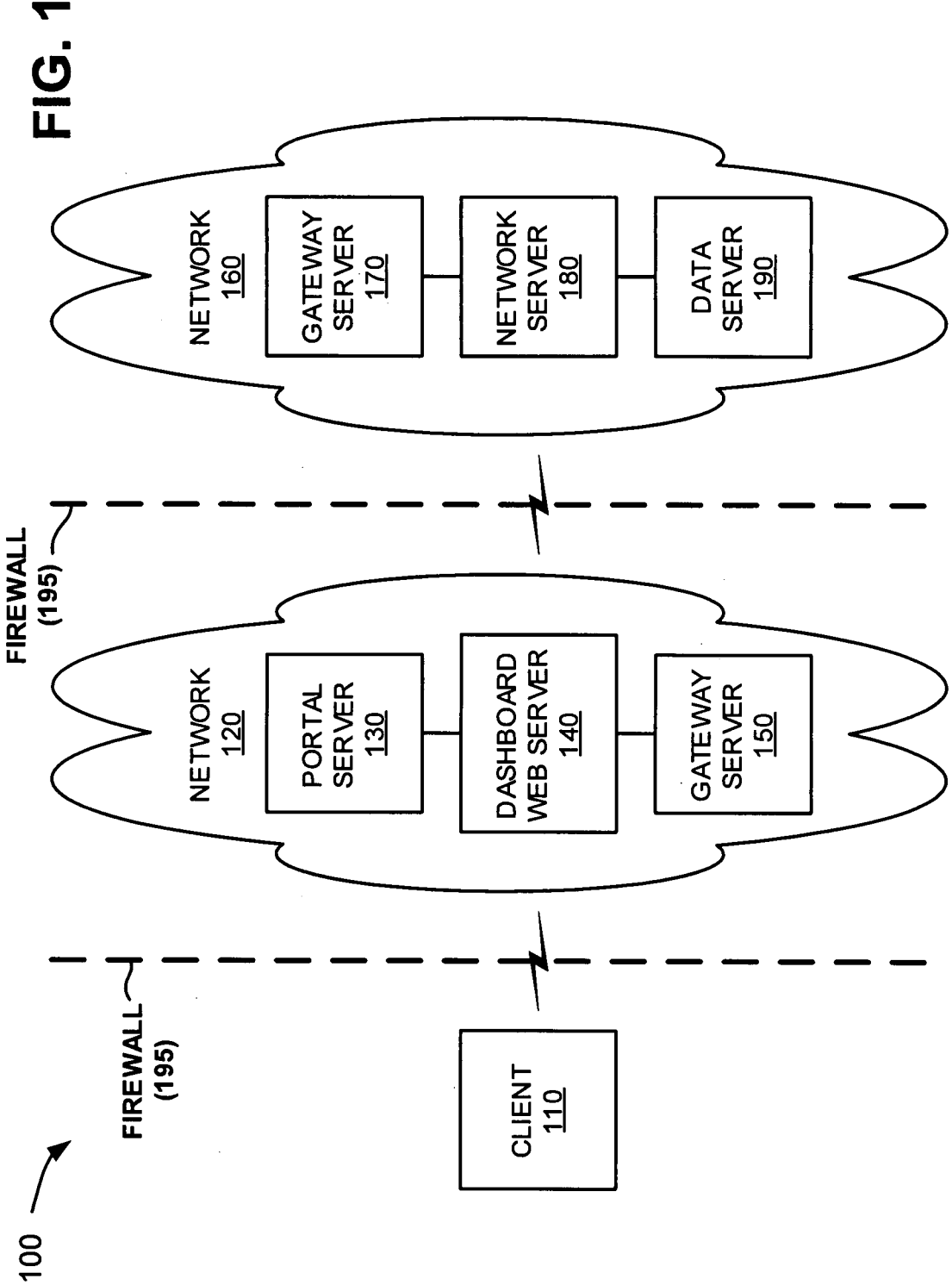
FIG. 1 is an exemplary diagram of a network in which systems and methods described herein may be implemented.

FIG. 1 is an exemplary diagram of a network 100 in which systems and methods described herein may be implemented. Network 100 may include a client 110, a network 120 that includes a portal server 130, a dashboard web server 140, and a gateway server 150, and a network 160 that includes a gateway server 170, a network server 180, and a data server 190. Portal server 130, dashboard web server 140, and gateway server 150 may be connected to one another via network 120. Gateway server 170, network server 180, and data server 190 may be connected to one another via network 160. One client, two networks, and six servers have been illustrated in FIG. 1 for simplicity. In practice, there may be more or less clients, networks, and/or servers. Also, in some instances, a client may perform one or more functions of a server, and a server may perform one or more functions of a client. Furthermore, in other instances, one of servers 130-150 and/or 170-190 may perform one or more functions of another one of servers 130-150 and/or 170-190. As further shown in FIG. 1, firewalls 195 may be provided between client 110 and network 120, and between network 120 and network 160.

Client 110 may include one or more entities. An entity may be defined as a device, such as a computer, a personal digital assistant (PDA), a laptop, or another type of computation or communication device, a thread or process running on one of these devices, and/or an object executable by one of these devices. In one implementation, client may enable a user to create, review, access, prioritize, etc. dashboard information (e.g., a user's inventory and any alarms, tickets, and/or maintenance events associated with the inventory) in a manner described herein.

Networks 120 and 160 each may include a Public Land Mobile Network (PLMN), a local area network (LAN), a wide area network (WAN), a metropolitan area network (MAN), a telephone network, such as the Public Switched Telephone Network (PSTN) or a cellular telephone network, an intranet, the Internet, or a combination of networks. In one implementation, networks 120 and 160 each may include a secure or private network, an intranet, a local network, applications and/or devices provided in a secure network, an intranet, or a local network, and/or any other network, device, application, and/or property that may require authorization and/or authentication. Client 110 may connect to network 120 via wired and/or wireless connections. Network 120 may connect to network 160 via wired and/or wireless connections.

Portal server 130 may include one or more server entities that gather, process, search, and/or provide information in a manner described herein. In one implementation, portal server 130 may provide a point of access to information which may be linked from various logically related applications. For example, portal server 130 may present information from diverse sources in a unified way, and may provide a way for enterprise systems to provide a consistent look and feel with access control and procedures for multiple applications. In another example, portal server 130 may provide personalized capabilities to its visitors (e.g., users or customers), providing a pathway to other content.

Dashboard web server 140 may include one or more server entities that gather, process, search, and/or provide information in a manner described herein. In one implementation, dashboard web server 140 may provide a dashboard that presents and/or maps a customer's inventory (e.g., circuits, devices, etc. associated with a customer's network) and any alarms, tickets, and/or maintenance events associated with the customer's inventory. For example, dashboard web server 140 may provide a dashboard interface group identifier that groups and/or correlates one or more customer identifiers into a single customer identifier. The dashboard interface group identifier may associate one or more customer products (e.g., inventory, tickets, alarms, etc.) with the single customer identifier, and/or may validate the single customer identifier. Further details of dashboard web server 140 are provided below in connection with FIGS. 3 and 8.

Gateway servers 150 and 170 each may include one or more server entities that gather, process, search, and/or provide information in a manner described herein. In one implementation, gateway servers 150 and 170 each may serve as an entrance to networks 120 and 160, respectively. For example, in enterprise systems, gateway servers 150 and 170 each may route traffic from a device outside of networks 120 and 160, respectively, and may act as a proxy server and/or a firewall. In another example, gateway servers 150 and 170 each may be associated with a router (e.g., which may use headers and forwarding tables to determine where packets may be sent), and a switch (e.g., which may provide a path for the packet in and out of gateway servers 150 and 170).

Network server 180 may include one or more server entities that gather, process, search, and/or provide information in a manner described herein. For example, in one implementation, network server 180 may include one or more of a formula server, an analytics server, a web services management server, etc.

Data server 190 may include one or more server entities that gather, process, search, and/or provide information in a manner described herein. For example, in one implementation, data server 190 may store customer data repositories (e.g., associated with users of client 110), may store information associated with one or more customer products (e.g., inventory, tickets, alarms, etc.), and/or may store any other information capable of being provided by dashboard web server 140 to a customer (or user) via client 110.

Firewalls 195 may include any mechanisms that may regulate the types of traffic entering and/or exiting a public and/or private network (e.g., network 120 and/or network 160). In one implementation, firewalls 195 may be implemented by devices provided within networks 120 and 160, such as gateway servers 150 and 170. In other implementations, firewalls 195 may be implemented by devices other than gateway servers 150 and 170.

Although FIG. 1 shows exemplary components of network 100, in other implementations, network 100 may contain fewer, different, or additional components than depicted in FIG. 1.

Figure 2:
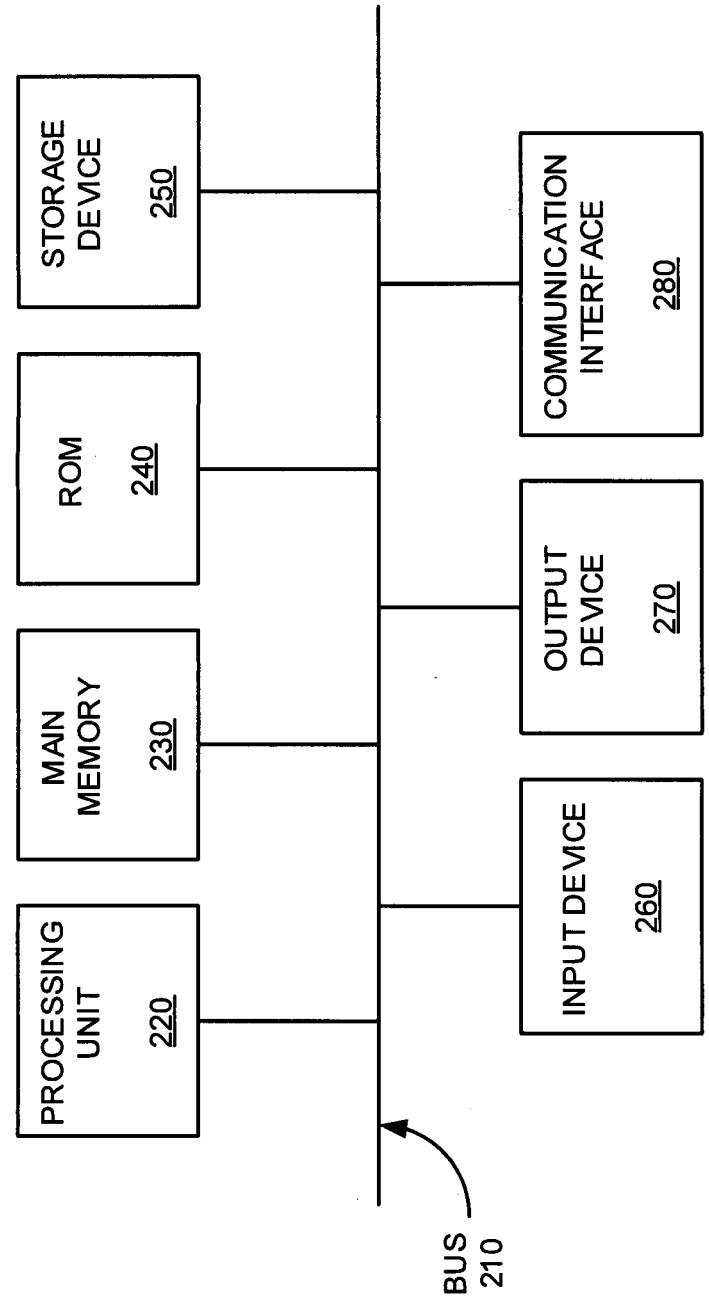
FIG. 2 is an exemplary diagram of a client and/or one or more servers of FIG. 1.

FIG. 2 is an exemplary diagram of a client/server entity corresponding to client 110 and/or servers 130-150 and 170-190. As illustrated, the client/server entity may include a bus 210, a processing unit 220, a main memory 230, a read-only memory (ROM) 240, a storage device 250, an input device 260, an output device 270, and/or a communication interface 280. Bus 210 may include a path that permits communication among the components of the client/server entity.

Processing unit 220 may include a processor, microprocessor, or other type of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to the client/server entity, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 140.

As will be described in detail below, the client/server entity may perform certain operations in response to processing unit 220 executing software instructions contained in a computer-readable medium, such as main memory 230. A computer-readable medium may be defined as a physical or logical memory device and/or carrier wave. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of the client/server entity, in other implementations, the client/server entity may contain fewer, different, or additional components than depicted in FIG. 2. In still other implementations, one or more components of the client/server entity may perform one or more of the tasks performed by one or more other components of the client/server entity.

Figure 3:
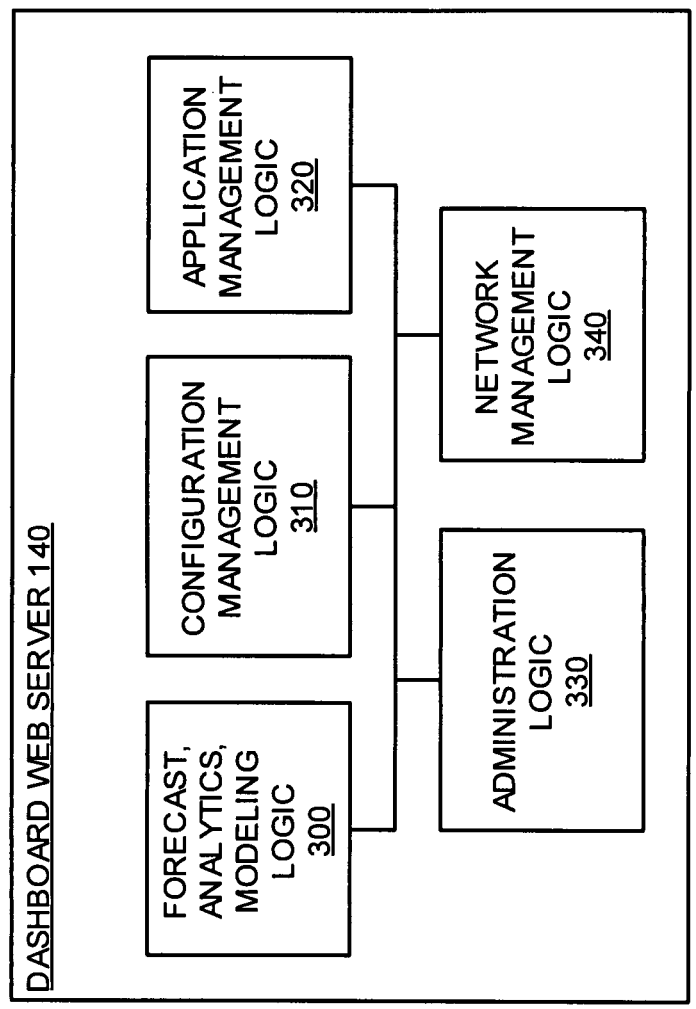
FIG. 3 is a diagram depicting exemplary functions capable of being performed by a dashboard web server of FIG. 1.

FIG. 3 is a diagram depicting exemplary functions capable of being performed by dashboard web server 140. As illustrated, dashboard web server 140 may include a variety of functional components, such as forecast, analytics, modeling logic 300, configuration management logic 310, application management logic 320, administration logic 330, and/or network management logic 340.

Forecast, analytics, modeling logic 300 may provide network modeling and/or capacity planning for a network associated with a customer (e.g., a user of client 110). For example, in one implementation, forecast, analytics, modeling logic 300 may permit a customer to perform network impact projections (e.g., on a network associated with the customer), expense planning (e.g., for the customer's network), and/or "what-if" scenarios (e.g., the customer may determine what would happen to the customer's network if an additional circuit was added).

Configuration management logic 310 may provide command and control capabilities of a network associated with a customer (e.g., a network provided by a dashboard generated by dashboard web server 140). In one implementation, configuration management logic 310 may permit a customer to manage a configuration of the customer's network. For example, configuration management logic 310 may permit the customer to create rules-based routing, and to request bandwidth on demand for the customer's network. In another example, configuration management logic 310 may permit the customer to test its network, and may provide the customer with network inventory and auto-discovery tools.

Application management logic 320 may provide business services management tools for a network associated with a customer. For example, in one implementation, application management logic 320 may permit the customer to perform general business outcome testing, business impact analysis, and/or true cost of service metrics for the customer's network. In another example, application management logic 320 may provide enterprise application interfaces (e.g., point-of-sale networks and kiosks), web hosting, and/or security management services for the customer's network.

Administration logic 330 may provide self service tools for a customer and a network associated with the customer. For example, in one implementation, administration logic 330 may provide service provisioning, a service catalog, account information, the customer's roles and entitlements, an account communicator, and/or online collaboration services for the customer's network.

Network management logic 340 may provide network operation services for a network associated with a customer. For example, in one implementation, network management logic 340 may provide fault and trouble management, network availability status, performance reporting, metric reporting, a network topology map, inventory and/or auto discovery services, security and/or threat identification services, and/or customer platform access services for the customer's network.

Although FIG. 3 shows exemplary functional components of dashboard web server 140, in other implementations, dashboard web server 140 may contain fewer, different, or additional functional components than depicted in FIG. 3. In still other implementations, one or more functional components of dashboard web server 140 may perform one or more of the tasks performed by one or more other functional components of dashboard web server 140.

Figure 4:
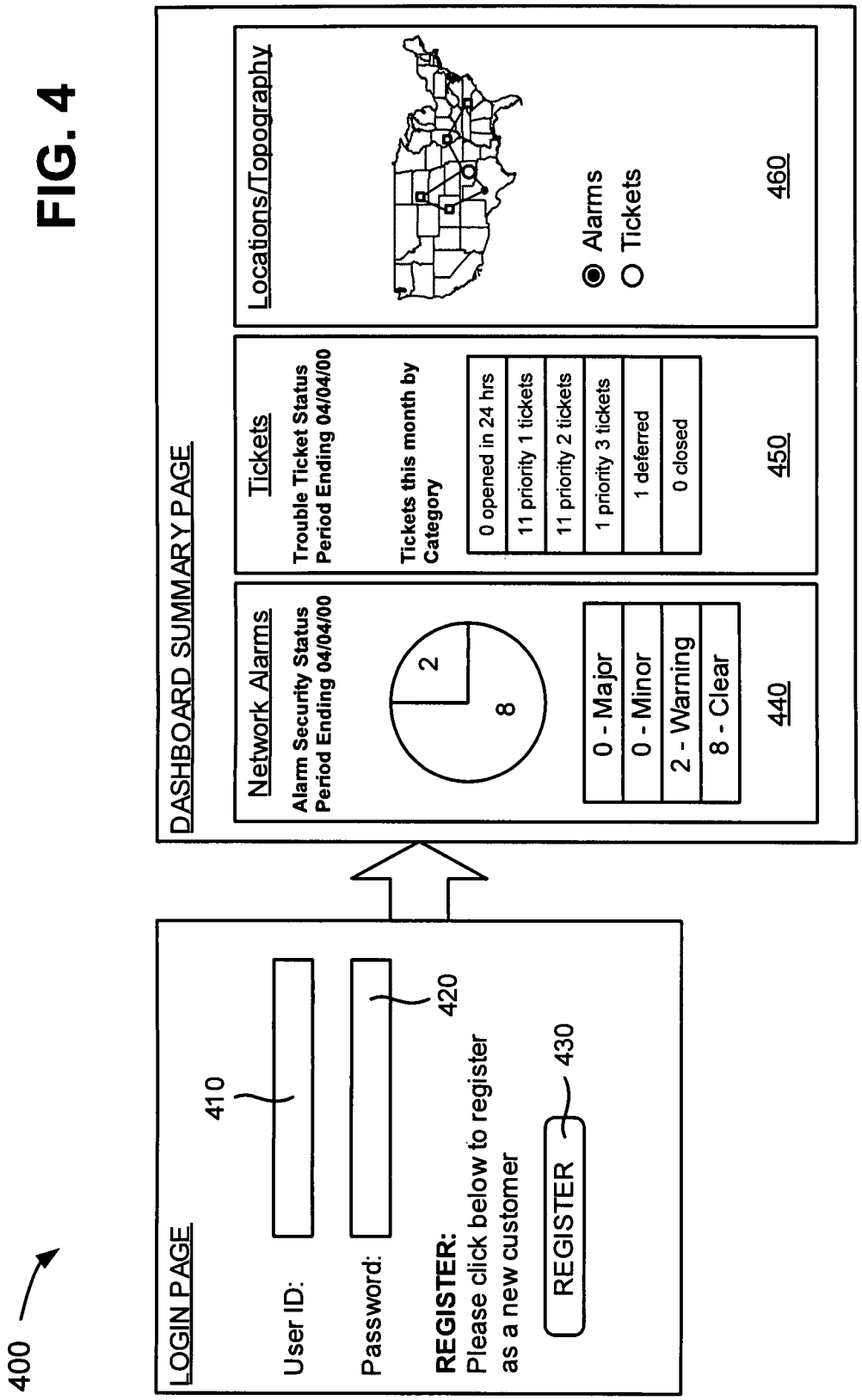
FIG. 4 is a diagram of an exemplary user interface that depicts a login page and a dashboard summary page, and may be provided by the dashboard web server of FIG. 1.

FIG. 4 is a diagram of an exemplary user interface 400 that depicts a login page and a dashboard summary page. In one implementation, user interface 400 may be provided by dashboard web server 140 to client 110. As illustrated, the login page of user interface 400 may depict a variety of mechanisms for a user (e.g., via client 110) to access information about a network, such as a user identification (ID) field 410, a password field 420, and/or a mechanism 430 to enable a new customer to register.

User ID field 410 may enable a customer to enter customer identification information (e.g., a numeric string, a string of letters, an alphanumeric string, etc.) that may identify the customer to dashboard web server 140. Password field 420 may enable the customer to enter a unique password (e.g., a numeric string, a string of letters, an alphanumeric string, etc.) that may ensure dashboard web server 140 that the customer identified in user ID field 410 is a valid customer. Dashboard web server 140 may compare the information entered in user ID field 410 and/or password field 420 to a database in order to provide secure access to the customer's network information.

Register mechanism 430 may include a button, an icon, a link, and/or other similar selection mechanisms. If a customer selects register mechanism 430, the customer may be permitted to register as a new customer with dashboard web server 140. For example, the customer may be presented with a user interface that enables the customer to enter registration information (e.g., a user ID, a password, one or more networks associated with the customer, customer billing information, a mailing address, etc.). If a customer registers with dashboard web server 140, the customer may be able to access the services provided by dashboard web server 140 via user ID field 410 and/or password field 420.

If a customer successfully logs into dashboard web server 140 (e.g., via input of correct information into user ID field 410 and password field 420), user interface 400 (e.g., via dashboard web server 140) may present the dashboard summary page shown in FIG. 4. As illustrated, the dashboard summary page of user interface 400 may provide a variety of information about one or more networks associated with a customer (e.g., a customer who accessed dashboard web server 140 via the login page). For example, the dashboard summary page may provide a network alarms section 440, a tickets section 450, and/or a locations/topography section 460.

Network alarms section 440 may display any alarm conditions occurring in the customer's network, and/or the severity of any alarm conditions. For example, as shown in FIG. 4, the customer's network may include "0" major network alarms, "0" minor network alarms, "2" warning network alarms, and/or "8" network alarms that have cleared alarm status (e.g., an alarm does not exist anymore).

Tickets section 450 may display any tickets related to a maintenance event and/or an alarm condition. A "ticket," as the term is used herein, is to be broadly construed to include a mechanism (e.g., a trouble ticket or trouble report) that may be used to track detection, reporting, and resolution of some type of problem (e.g., an outage in the customer's network). For example, a ticket may be created by a trouble ticketing system as specified by the Internet Engineering Task Force (IETF) in RFC 1297, ticketing software, etc. In another example, a ticket may define a problem and may help to coordinate with people who may work on the problem. In still another example, as a ticket moves though a system (e.g., via dashboard web server 140), it may be classified as a certain type of problem, which in turn may determine an expertise level of people assigned to address the ticket. If a problem is not resolved, an "open ticket" for the problem may remain in a work queue. If a problem is resolved, a ticket may be "closed."

Returning to FIG. 4, tickets section 450 may provide a status of a ticket, and/or may display a number of tickets in a time period (e.g., monthly, weekly, etc.) by category (e.g., priority, opened, closed, etc.). For example, as shown in FIG. 4, tickets section 450 may indicate that "0" tickets have been opened in the past twenty-four hours, "11" tickets are priority "1" tickets, "11" tickets are priority "2" tickets, "1" ticket is a priority "3" ticket, "1" ticket has been deferred, and "0" tickets have been closed.

Locations/topography section 460 may provide a visual display (e.g., a map) of locations of inventory items of the customer's network, and/or any alarms and/or tickets associated with the customer's inventory items. For example, as shown in FIG. 4, an alarm may exist for an inventory item (e.g., a circuit, a node, a device, etc.) located in Texas, and a ticket may exist for an inventory item located in Oklahoma.

The dashboard login and summary pages depicted in FIG. 4 and other dashboard-related pages (e.g., FIGS. 5-7) may collect and display a customer's inventory (e.g., circuits, devices, etc. of a network associated with the customer), and/or any alarms, tickets, and/or maintenance events associated with the customer's inventory. In one implementation, the dashboard-related pages may display a map providing locations of the customer's inventory, and/or any alarms, tickets, and/or maintenance events occurring at such locations. A user of the dashboard-related pages may zoom in on any one of the locations and may view specific details of a site, equipment, circuits, etc. at the location, and/or any alarms, tickets, maintenance events, etc. associated with the location. The map may include symbols (e.g., icons) with unique shapes and/or color coding which may correspond to inventory items, alarms, tickets, maintenance events, etc. In other implementations, the dashboard-related pages may display the customer's inventory, and/or any alarms, tickets, and/or maintenance events associated with the customer's inventory in one or more pop-up windows, in a tabular format in one or more windows, in a spreadsheet-like format in one or more windows, etc. In other implementations, the dashboard-related pages may provide a customer-specific, consolidated near real-time view of operational data (e.g., network performance, trouble management, etc.), and/or may provide customizable views and access for customers to services and performance information.

In one exemplary implementation, dashboard web server 140 may consolidate such information (e.g., inventory, alarms, tickets, maintenance events, etc.), and may correlate the information via an interface group identifier (e.g., for inventory and/or tickets), as described herein, and/or via circuit or device identifications (e.g., for alarms and/or maintenance events). In another exemplary implementation, dashboard web server 140 may include the features set forth in co-pending application Ser. No. 11/771,545, entitled "DASHBOARD INTERFACE GROUP IDENTIFIER," filed on the same date herewith, the disclosure of which is incorporated by reference herein in its entirety. In still another exemplary implementation, dashboard web server 140 may include the features set forth in co-pending application Ser. No. 11/771,337, entitled "DASHBOARD MAP FILTERING AND CLUTTER/DECLUTTER ALGORITHMS," filed on the same date herewith, the disclosure of which is incorporated by reference herein in its entirety.

Dashboard web server 140 may include a network availability algorithm that may be based upon ticket outage time data (e.g., provided in data server 190). For example, dashboard web server 140 may correlate customer information to network inventory used for service to the customer associated with the customer information. Based upon the inventory assigned to the customer, dashboard web server 140 may collect an outage time per item of inventory (e.g., per circuit). This information may be stored in data server 190 and may include a link to an inventory system which dashboard web server 140 may also use. The outage time may be calculated to exclude any outage time associated with the customer so that a true outage time calculation, at any given time, may be provided that may be based on down time of the inventory (e.g., circuit, device, etc.) due the customer's network issues. Dashboard web server 140 may use the outage time to provide an indication of the customer's network performance. For example, dashboard web server 140 may display (e.g., via client 110) visual indicators via color coded status bars, degraded duration times, and/or critical duration calculations based on customer-provided ranges. In another example, dashboard web server 140 may permit the customer to review individual components of an outage duration that may be sorted based on circuit product type. In still another example, dashboard web server 140 may correlate and/or present customer data-to-circuit-to-network availability information.

Although FIG. 4 shows exemplary elements of user interface 400, in other implementations, user interface 400 may contain fewer, different, or additional elements than depicted in FIG. 4.

Figure 5:
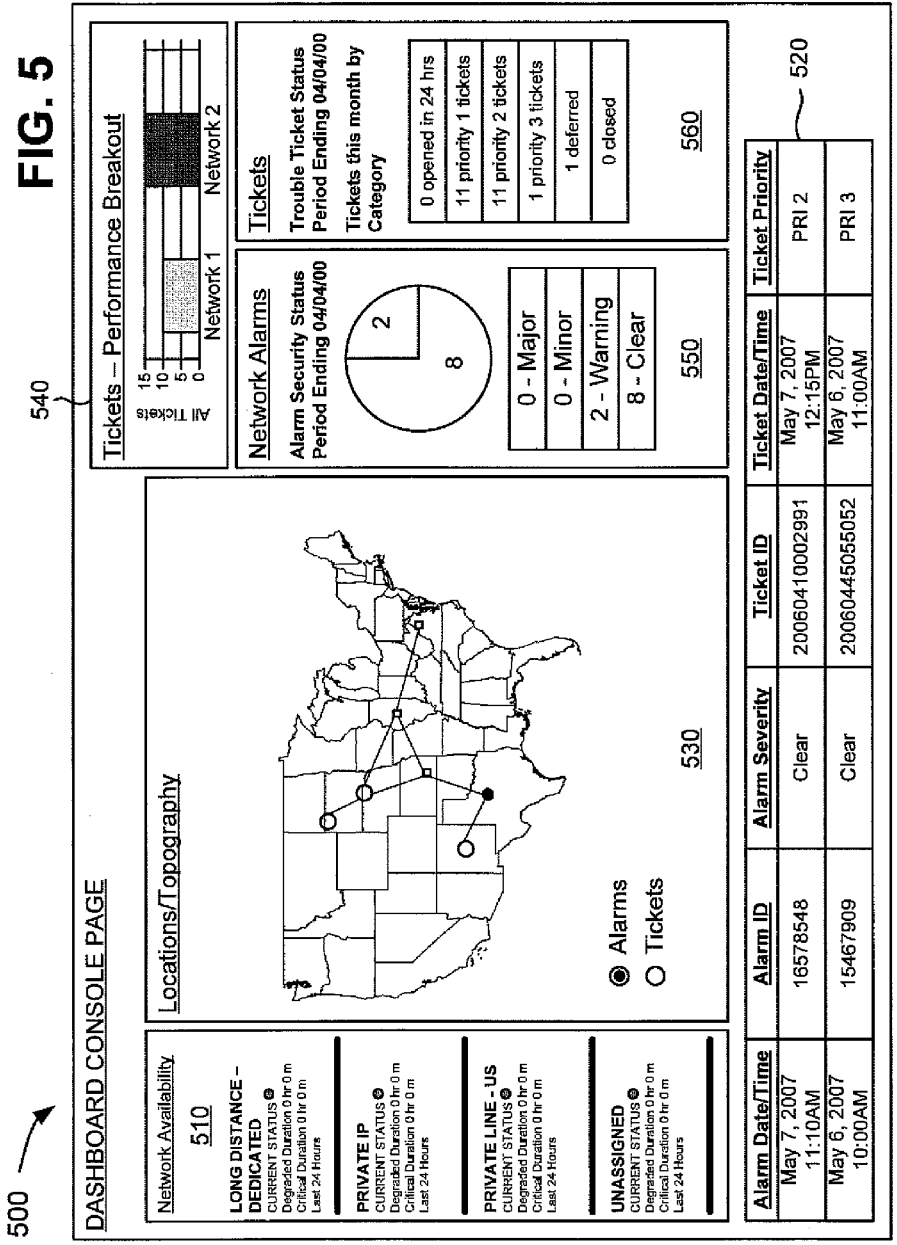
FIG. 5 is a diagram of an exemplary user interface that depicts a dashboard console page, and may be provided by the dashboard web server of FIG. 1.

FIG. 5 is a diagram of an exemplary user interface 500 that depicts a dashboard console page. In one implementation, user interface 500 may be provided by dashboard web server 140 to client 110. As illustrated, the dashboard console page of user interface 500 may depict a variety of information about one or more networks associated with a customer (e.g., a customer who accessed dashboard web server 140 via client 110). For example, the dashboard console page may provide a network availability section 510, an alarms/ticketing section 520, a locations/topography section 530, a tickets performance breakout section 540, a network alarms section 550, and/or a tickets section 560.

Network availability section 510 may provide a list of one or more networks associated with a customer. For example, as shown in FIG. 5, network availability section 510 may depict a dedicated long distance network, a private IP network, a private line network in the United States (U.S.), and an unassigned network that may be associated with a customer. Network availability section 510 may provide information about each network listed therein. For example, as shown in FIG. 5, a current status, a degraded duration (e.g., in hours and minutes over the last twenty-four hours), and/or a critical duration (e.g., in hours and minutes over the last twenty-four hours) for each network depicted in network availability section 510 may be provided.

Alarms/ticketing section 520 may provide a list of information associated with any alarms and/or tickets associated with any inventory of the customer's network(s). For example, as shown in FIG. 5, alarms/ticketing section 520 may depict an alarm date/time category, an alarm identification (ID) category, an alarm severity category, a ticket identification (ID) category, a ticket date/time category, and/or a ticket priority category. In other implementations, alarms/ticketing section 520 may include other categories, such as a network device identification category, a circuit identification category, a service type category, a location category, a description category, etc.

Alarm and/or ticketing information may be associated with each of these categories. For example, the alarm date/time category may include a date and time of "May 7, 2007, 11:10 AM," the alarm ID category may include an ID of "16578548," the alarm severity category may include a severity of "clear," the ticket ID category may include an ID of "20060410002991," the ticket date/time category may include a date and time of "May 7, 2007, 12:15 PM," and/or the ticket priority category may include a priority of "PRI 2." Such information may indicate that an alarm occurred in the customer's network (e.g., on a particular device and/or circuit of the network, and/or at a particular location in the network) on May 7, 2007 at 11:10 AM, that the alarm was identified by the number "16578548," and that the alarm had been cleared. Such information may further indicate that a ticket (with a level two priority) identified by the number "20060410002991" was issued on May 7, 2007 at 12:15 PM to address the alarm identified by the number "16578548."

Locations/topography section 530 may provide a visual display (e.g., a map) of locations of inventory items of the customer's network, and/or any alarms and/or tickets associated with the customer's inventory items. For example, as shown in FIG. 5, an alarm may exist for an inventory item (e.g., a circuit, a node, a device, etc.) located in Texas, and a ticket may exist for an inventory item located in New Mexico. In one implementation, a customer may select one of the locations of the inventory items provided by the map in locations/topography section 530, and dashboard web server 140 may display additional details about the selected location. For example, if the customer selected the location of the alarm in Texas, dashboard web server 140 may provide information such as the duration of the alarm, any tickets associated with the alarm, the device or devices associated with the alarm, etc.

Tickets performance breakout section 540 may provide a performance breakout for tickets issued for one or more networks associated with a customer. The performance breakout may be based on a ticket type (e.g., repeat tickets, chronic tickets, number of tickets, etc.). Tickets performance breakout section 540 may further provide a ticket performance breakout for different customers associated with dashboard web server 140 so that customers may see how the network provider (e.g., an owner of the networks and/or dashboard web server 140) are addressing tickets throughout the network provider's supported networks.

Network alarms section 550 may display any alarm conditions occurring in the customer's network, and/or the severity of any alarm conditions. For example, as shown in FIG. 5, the customer's network may include "0" major network alarms, "0" minor network alarms, "2" warning network alarms, and/or "8" network alarms that have cleared alarm status (e.g., an alarm does not exist anymore).

Tickets section 560 may display any tickets related to a maintenance event and/or an alarm condition. Tickets section 560 may provide a status of a ticket, and/or may display a number of tickets in a time period (e.g., monthly, weekly, etc.) by category (e.g., priority, opened, closed, etc.). For example, as shown in FIG. 5, tickets section 560 may indicate that "0" tickets have been opened in the past twenty-four hours, "11" tickets are priority "1" tickets, "11" tickets are priority "2" tickets, "1" ticket is a priority "3" ticket, "1" ticket has been deferred, and "0" tickets have been closed.

Although FIG. 5 shows exemplary elements of user interface 500, in other implementations, user interface 500 may contain fewer, different, or additional elements than depicted in FIG. 5.

Figure 6:
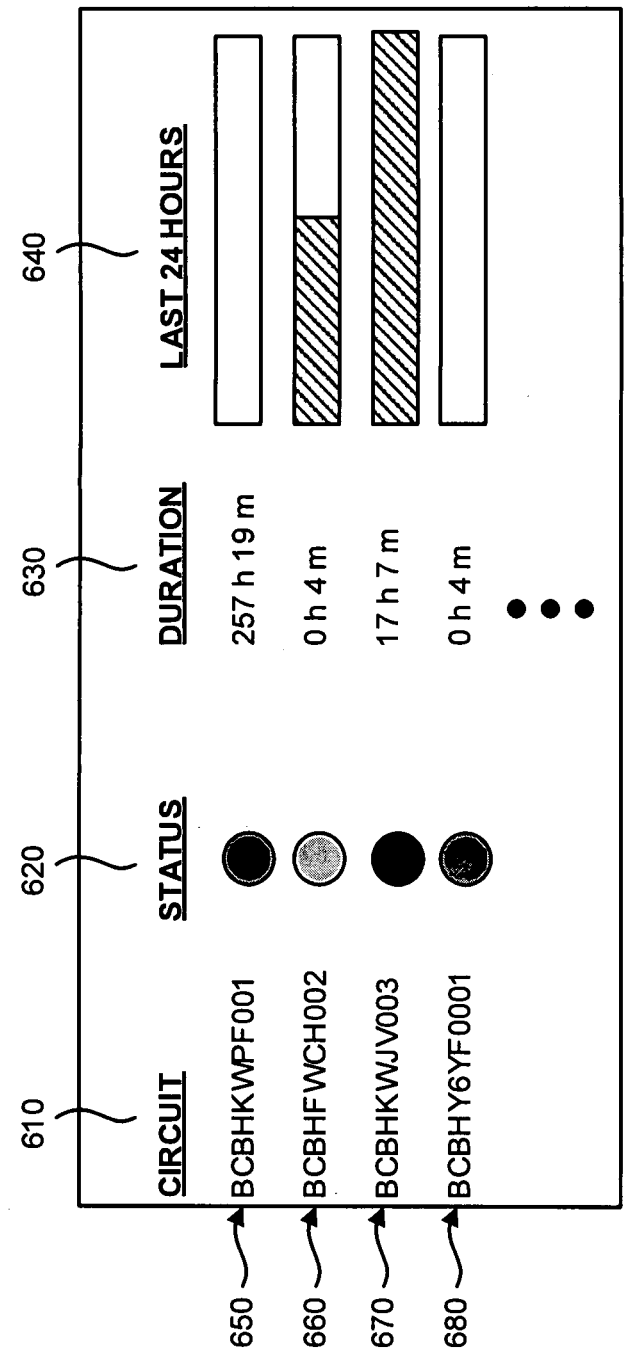
FIG. 6 is a diagram of an exemplary user interface that depicts an alarm and ticket menu, and may be provided by the dashboard web server of FIG. 1.

FIG. 6 is a diagram of an exemplary user interface 500 that depicts an alarm and ticket menu. In one implementation, user interface 600 may be provided by dashboard web server 140 to client 110. As illustrated, the alarm and ticket menu of user interface 600 may depict a variety of information about one or more networks associated with a customer (e.g., a customer who accessed dashboard web server 140 via client 110). For example, the alarm and ticket menu may provide a circuit category 610, a status category 620, a duration category 630, and/or an indicator 640 indicating a status for the last twenty-four hours. Each category may include one or more entries. As shown in FIG. 6, user interface 600 may display a first entry 650, a second entry 660, a third entry 670, and a fourth entry 680. Although user interface 600 depicts four entries, in other implementations, user interface 600 may display fewer, more, or different entries than depicted in FIG. 6. Furthermore, user interface 600 may display fewer, different, or additional categories than depicted in FIG. 6.

Circuit category 610 may provide a list of circuits (or other inventory items) of the customer's network. For example, first entry 650 may include a circuit ID number of "BCBHK-WPF001" under circuit category 610, second entry 660 may include a circuit ID of "BCBHFWCH002" under circuit category 610, third entry 670 may include a circuit ID of "BCB-HKWJV003" under circuit category 610, and fourth entry 680 may include a circuit ID of "BCBHY6YF0001" under circuit category 610.

Status category 620 may provide a visual indication (e.g., green for a functioning circuit, yellow for a circuit with a warning, and/or red for a circuit experiencing an alarm condition) of a status of a circuit provided in circuit category 610. For example, first entry 650 and fourth entry 680 may include a green status indicator under status category 620, second entry 660 may include a yellow status indicator under status category 620, and third entry 670 may include a red status indicator under status category 620.

Duration category 630 may provide the duration (e.g., in hours (h) and minutes (m)) of an alarm and/or a ticket associated with a circuit provided in circuit category 610. For example, first entry 650 may include a duration of "257 h 19 m" under duration category 630, second entry 660 may include a duration of "0 h 4 m" under duration category 630, third entry 670 may include a duration of "17 h 7 m" under duration category 630, and fourth entry 680 may include a duration of "0 h 4 m" under duration category 630.

Indicator 640 may provide a visual indication (e.g., a bar diagram) indicating a status of a circuit provided in circuit category 610 for the past twenty-four hours. For example, first entry 650 and fourth entry 680 may include an indication of circuit functionality under indicator category 640, second entry 660 may include an indication of partial circuit functionality under indicator category 640, and third entry 670 may include an indication of circuit failure under indicator category 640.

Although FIG. 6 shows exemplary elements of user interface 600, in other implementations, user interface 600 may contain fewer, different, or additional elements than depicted in FIG. 6.

Figure 7:
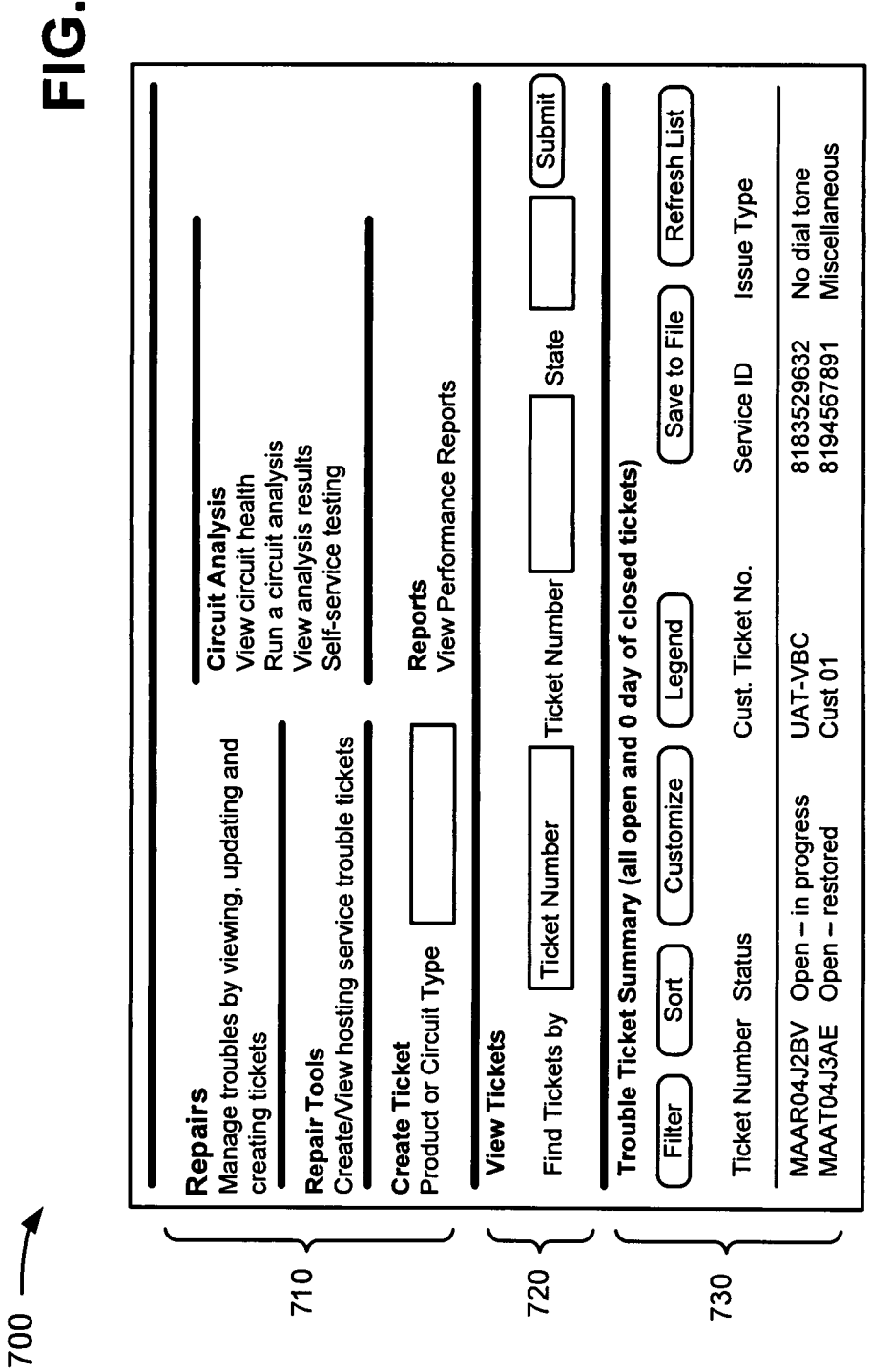
FIG. 7 is a diagram of an exemplary user interface that depicts a repairs and tickets menu, and may be provided by the dashboard web server of FIG. 1.

FIG. 7 is a diagram of an exemplary user interface 700 that depicts a repairs and tickets menu. In one implementation, user interface 700 may be provided by dashboard web server 140 to client 110. As illustrated, the repairs and tickets menu of user interface 700 may depict a variety of information about one or more networks associated with a customer (e.g., a customer who accessed dashboard web server 140 via client 110). For example, the repairs and tickets menu may provide a repairs section 710, a view tickets section 720, and/or a trouble ticket summary section 730.

Repairs section 710 may enable a customer to manage any problems associated with the customer's network. For example, repairs section 710 may include a repair tools portion that may permit the customer to create and view trouble tickets associated with the customer's network. Repairs section 710 may include a create ticket portion that may permit the customer to create a ticket for one or more products or circuits of the customer's network. A circuit analysis portion of repairs section 710 may permit the customer to perform a variety of tasks, such as view circuit health, run a circuit analysis, view circuit analysis results, perform self-service testing, etc. A reports portion of repairs section 710 may permit the customer to view performance reports associated with the customer's network(s).

View tickets section 720 may enable a customer to search for a specific ticket so that the customer may view additional information associated with the specific ticket. For example, the customer may find a ticket based on a ticket number by providing the ticket number and by selecting a submit mechanism. The customer may be provided with additional information associated with the specified ticket number. Alternatively and/or additionally, the customer may find one or more tickets based on location information (e.g., a state where an event addressed by the ticket is occurring) by providing the location information and by selecting the submit mechanism. The customer may be provided with a list of tickets from the specified location, and may select one or more of the listed tickets to see additional ticket information.

Trouble ticket summary section 730 may enable a customer to manage a list of open tickets associated with the customer's network. For example, trouble ticket summary section 730 may provide a list of open tickets, and may display information associated with the open tickets. Such associated information may include a ticket number (e.g., "MAAR04J2BV"), a status (e.g., "Open—in progress"), a customer ticket number (e.g., "UAT-VBC"), a service identification (ID) (e.g., "8183529632"), an issue type (e.g., "No dial tone"), a product type (e.g., "private IP"), a creation date (e.g., "May 17, 2006 at 11:01 AM"), etc. Trouble ticket summary section 730 may provide mechanisms that enable the customer to manage the list of open tickets, such as a filter mechanism (e.g., to enable the customer to filter the list based on a criteria), a sort mechanism (e.g., to enable the customer to sort the list based on a criteria), a customize mechanism (e.g., to enable the customer to customize the list), a legend mechanism (e.g., to enable the customer to adjust the legend of the list), a save-to-file mechanism (e.g., to enable the customer to save the list), and/or a refresh mechanism (e.g., to enable the customer to refresh the list).

Although FIG. 7 shows exemplary elements of user interface 700, in other implementations, user interface 700 may contain fewer, different, or additional elements than depicted in FIG. 7.

Figure 8A:
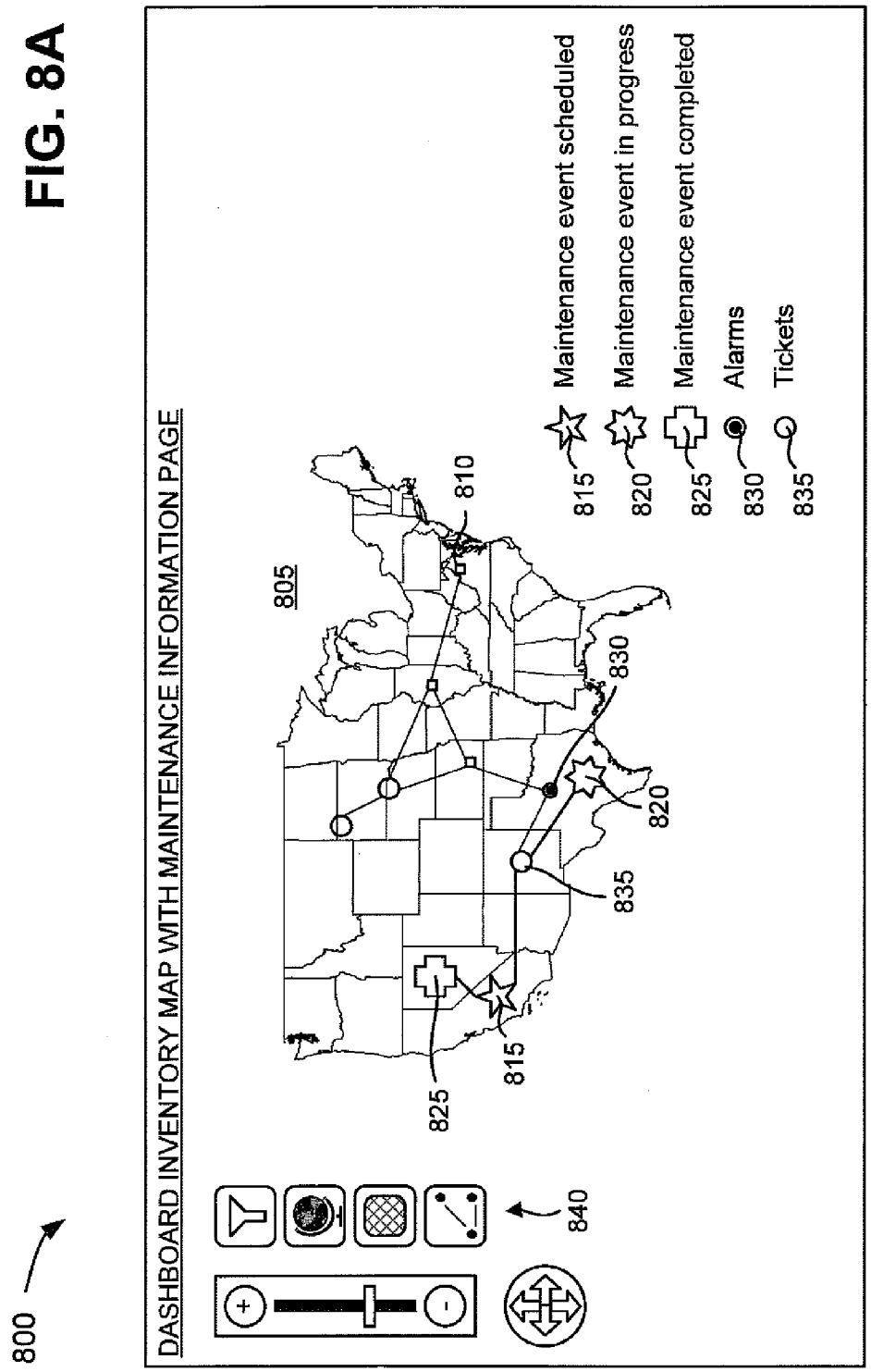
FIGS. 8A and 8B are diagrams of an exemplary user interface that depicts a dashboard inventory map with maintenance information.
Figure 8B:
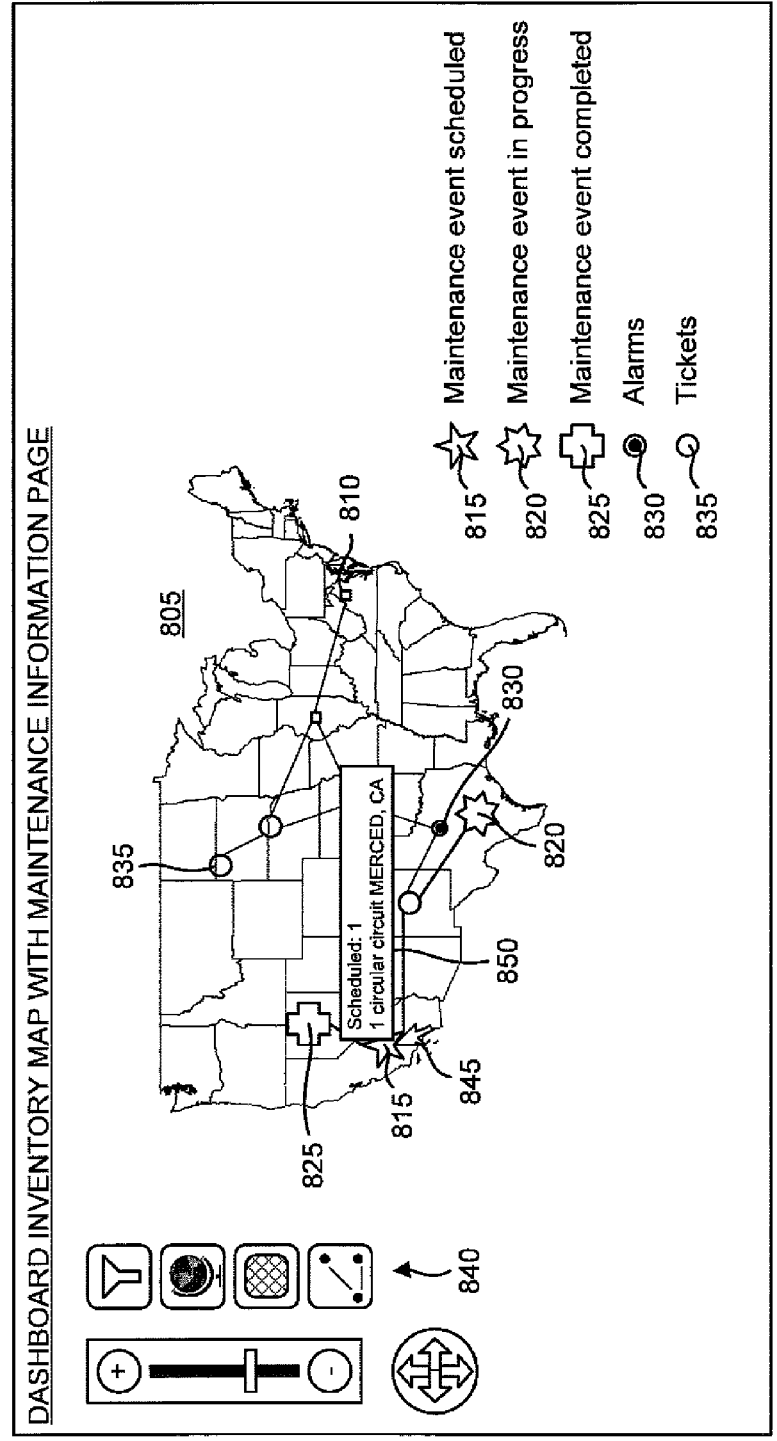

FIGS. 8A and 8B are diagrams of an exemplary user interface 800 that depicts a dashboard inventory map with maintenance information page. In one implementation, user interface 800 may be provided by dashboard web server 140 to client 110. As illustrated in FIG. 8A, the dashboard inventory map with maintenance information page of user interface 800 may depict a variety of information about one or more networks associated with a customer (e.g., a customer who accessed dashboard web server 140 via client 110), and/or maintenance events associated with those networks. For example, the dashboard inventory map with maintenance information page may provide a map 805 of the customer's one or more networks. Map 805 may include network inventory items 810, a scheduled maintenance event 815, an in progress maintenance event 820, a completed maintenance event 825, alarms 830, tickets 835, and/or map manipulation tools 840. In one implementation, the dashboard inventory map with maintenance information page may depict real time maintenance status information that may show customers planned, current, and/or completed activities (e.g., maintenance events, alarms, tickets, etc.) from their networks.

Map 805 may provide a visual display (e.g., a map) of locations of inventory items (e.g., network inventory items 810) of the customer's network, and/or any alarms (e.g., alarms 830) and/or tickets (e.g., tickets 835) associated with the customer's inventory items. For example, as shown in FIG. 8A, alarm 830 may exist for an inventory item (e.g., a circuit, a node, a device, etc.) located in Texas, and ticket 835 may exist for an inventory item located in New Mexico. In one implementation, a customer may select one of the locations of the inventory items provided by map 805, and dashboard web server 140 may display additional details about the selected location. For example, if the customer selected the location of alarm 830 in Texas, dashboard web server 140 may provide information such as the duration of alarm 830, any tickets associated with alarm 830, the device or devices associated with the alarm 830, etc.

Network inventory item 810 may include any hardware (e.g., any circuit, device, node, etc.), any service (e.g., toll free phone numbers, digital subscriber line (DSL) services, etc.), etc. associated with a customer's one or more networks.

Scheduled maintenance event 815 may provide a visual indication (e.g., a colored icon, a shaped icon, etc.) of a location of the customer's network where a maintenance event may be scheduled to occur. A maintenance event may include any event that upkeeps (or sustains in an existing state_any hardware (e.g., any circuit, device, node, etc.), any service (e.g., toll free phone numbers, digital subscriber line (DSL) services, etc.), etc. associated with a customer's one or more networks. For example, as shown in FIG. 8A, scheduled maintenance event 815 may be scheduled to occur at the customer's inventory item located in California.

In progress maintenance event 820 may provide a visual indication (e.g., a colored icon, a shaped icon, etc.) of a location of the customer's network where a maintenance event may be in progress. For example, as illustrated in FIG. 8A, in progress maintenance event 820 (e.g., a circuit in the customer's network may be being repaired) may be occurring at the customer's inventory item located in Texas.

Completed maintenance event 825 may provide a visual indication (e.g., a colored icon, a shaped icon, etc.) of a location of the customer's network where a maintenance event may be completed. For example, as shown in FIG. 8A, completed maintenance event 825 (e.g., a circuit in the customer's network may have been repaired) may have been completed at the customer's inventory item located in Nevada.

Alarms 830 may provide a visual indication of a location where any alarm conditions may be occurring in the customer's network, and/or the severity of any alarm conditions. Alarms 830 may occur for any hardware (e.g., any circuit, device, node, etc.), any service (e.g., toll free phone numbers, digital subscriber line (DSL) services, etc.), etc. associated with a customer's one or more networks, and/or may indicate a problem (e.g., a disabled device, a request for maintenance, an interruption in service) associated with the hardware, service, etc. For example, as shown in FIG. 8A, alarm 830 may be occurring at the customer's inventory item located in Texas.

Tickets 835 may provide a visual indication of a location of the customer's network where any tickets related to a maintenance event and/or an alarm condition may have been issued. For example, as illustrated in FIG. 8A, ticket 835 may have been issued for a customer's inventory item located in New Mexico.

Map manipulation tools 840 may provide a variety of tools that may enable the customer to manipulate information displayed by map 805. For example, in one implementation, map manipulation tools 840 may include a filter tool that may enable a customer to filter items displayed by map 805. In another implementation, map manipulation tools 840 may include a background tool that may enable a customer to switch backgrounds for map 805. In still another implementation, map manipulation tools 840 may include a toggle tool that may enable a customer to turn on and/or off line connections for inventory items. In a further implementation, map manipulation tools 840 may include zooming and panning tools that may enable a customer to perform zoom and/or pan operations with map 805.

As shown in FIG. 8B, a customer may hover over (e.g., mouse over) any of the elements provided by map 805 (e.g., inventory item 810, scheduled maintenance event 815, in progress maintenance event 820, completed maintenance event 825, alarms 830, tickets 835) with a selection mechanism 845 (e.g., a mouse), and additional summary information about the element may be provided. In one implementation, as depicted in FIG. 8B, the customer may hover with selection mechanism 845 over scheduled maintenance event 815, and a window 850 providing additional summary information about scheduled maintenance event 815 may be displayed. For example, window 850 may provide information indicating that one maintenance event (e.g., "Scheduled: 1") is scheduled for a circuit provided in Merced, Calif. (e.g., "1 circular circuit MERCED, CA"). In other implementations, the customer may hover with selection mechanism 845 over other elements of map 805, and window 850 or windows may display additional summary information about the other elements.

Although FIGS. 8A and 8B show exemplary elements of user interface 800, in other implementations, user interface 700 may contain fewer, different, or additional elements than depicted in FIGS. 8A and 8B.

If a customer selects (e.g., with selection mechanism 845) an element provided by map 805 (e.g., by pointing and clicking on the element), another user interface may be displayed providing additional information about the selected element. FIG. 9 is a diagram of an exemplary user interface 900 that depicts information associated with a maintenance event (e.g., scheduled maintenance event 815) selected from the dashboard inventory map with maintenance information page of FIGS. 8A and 8B. In one implementation, user interface 900 may be provided by dashboard web server 140 to client 110. As illustrated, user interface 900 may depict a variety of information about the selected element (e.g., scheduled maintenance event 815) associated with the customer's network. For example, user interface 900 may provide site information 910 associated with the selected element, product information 920 associated with the selected element, maintenance event information 930 associated with the selected element, and/or additional maintenance event information 940.

Site information 910 may include information associated with a site (or a location) of the selected element. For example, site information 910 may include address information (e.g., "Address: 710 W 16TH"), city information (e.g., "MERCED"), state information (e.g., "CA"), country information (e.g., "USA"), and/or site identification information (e.g., "Site Id: 83859317").

Product information 920 may include information about a product associated with the selected element. For example, product information 920 may include information about one or more circuits, devices, services, etc. (e.g., a "FRAME RELAY" and/or items, e.g., "ZABHRH0W0001-P1201881," associated with "FRAME RELAY") associated with the selected element.

Maintenance event information 930 may include information about a maintenance event associated with the selected element. For example, maintenance event information 930 may include maintenance event identification information (e.g., "Maintenance Event Id: 345"), a planned date for the maintenance event (e.g., "Planned Date: Tue Oct 10 17:35:55 EDT 2006"), an actual date of the maintenance event (e.g., "Actual Date: Tue Oct 10 17:35:55 EDT 2006"), and/or completion status information for the maintenance event (e.g., "Completion Status: In Progress").

Additional maintenance event information 940 may include information about other maintenance events associated with the selected element. For example, additional maintenance event information 940 may include additional maintenance event identification information, planned dates for the other maintenance events, actual dates of the other maintenance events, and/or completion status information for the other maintenance events.

Although FIG. 9 shows exemplary elements of user interface 900, in other implementations, user interface 900 may contain fewer, different, or additional elements than depicted in FIG. 9.

If a customer selects (e.g., with selection mechanism 845) an element provided by user interface 900 (e.g., by pointing and clicking on the information), another user interface may be displayed providing additional information about the selected element. FIG. 10 is a diagram of an exemplary user interface 1000 that depicts information associated with a selected maintenance event (e.g., "Maintenance Event Id: 345") of FIG. 9. In one implementation, user interface 1000 may be provided by dashboard web server 140 to client 110. As illustrated, user interface 1000 may depict a variety of information about the selected element (e.g., "Maintenance Event Id: 345") associated with the customer's network. For example, user interface 1000 may provide event information 1010 associated with the selected element, status information 1020 associated with the selected element, and/or item identification information 1030 associated with the selected element.

Event information 1010 may include information associated with the selected maintenance event. For example, event information 1010 may include event identification information (e.g., "Event Id: 345"), request identification information (e.g., "Request Id: - - - "), a submission date of the selected maintenance event (e.g., "Submit Date: 10/10/2006 17:40"), an approval status of the selected maintenance event (e.g., "Approval Status: approved"), and/or an event code description (e.g., "Event Code Description: na").

Status information 1020 may include information associated with a status of the selected maintenance event. For example, status information 1020 may include completion status information (e.g., "Completion Status: IN_PROGRESS"), a planned start date for the selected maintenance event (e.g., "Planned Start: 10/10/2006 17:40"), an actual start date for the selected maintenance event (e.g., "Actual Start: 10/10/2006 17:40"), and/or an actual stop date for the selected maintenance event (e.g., "Actual Stop: 10/10/2006 17:40").

Item identification information 1030 may include information associated with the selected maintenance event. For example, item identification information 1030 may include an item identification (e.g., "Item Id: - - - "), a location of the selected maintenance event (e.g., "Location: dallas"), impact type information (e.g., "Impact Type"), a number of outages associated with the selected maintenance event (e.g., "Number of Outages: 1"), a duration of the outages (e.g., "Duration: 3"), a validation status of the selected maintenance event (e.g., "Validation Status: approved"), an equipment type associated with the selected maintenance event (e.g., "Equipment Type: ZD01"), a circuit type associated with the selected maintenance event (e.g., "Circuit Type: . . . "), a circuit identification associated with the selected maintenance event (e.g., "Circuit Id: ZDFG57758"), a ticket number associated with the selected maintenance event (e.g., "Ticket: 117772"), and/or an event summary (e.g., "Event Summary: na").

Although FIG. 10 shows exemplary elements of user interface 1000, in other implementations, user interface 1000 may contain fewer, different, or additional elements than depicted in FIG. 10.

FIG. 11 is a diagram depicting exemplary functions capable of being performed by a dashboard web server 140. As illustrated, dashboard web server 140 may include a variety of functional components, such as schedule maintenance events logic 1100 and/or interactive query logic 1110.

Schedule maintenance events logic 1100 may receive a customer identifier 1120 and/or one or more customer products 1130, and may correlate customer products 1130, in real time, for maintenance events associated with customer products 1130. Schedule maintenance events logic 1100 may use the correlation, in real time, to display visual indicators of the status of maintenance events associated with customer products 1130 (as indicated by reference number 1140). For example, schedule maintenance events logic 1100 may display a colored icon for a current status of an approved maintenance event. A yellow icon may be displayed by schedule maintenance events logic 1100 for an approved and pending maintenance event in order to show planned maintenance on the customer's network equipment. If the maintenance event is started and is active, a red icon may be displayed by schedule maintenance events logic 1100 in order show customers that they may be affected due to maintenance on network equipment. A green icon may be displayed by schedule maintenance events logic 1100 (e.g., indicating an all clear status) if a maintenance event is complete.

In one implementation, schedule maintenance events logic 1100 may host and display maintenance scheduling and tracking information, via visual indicators and in real time, on dashboard maps (e.g., map 805) associated with a customer's inventory items. For example, schedule maintenance events logic 1100 may provide scheduled maintenance events for a customer's network devices and/or for outages affecting customers (e.g., a service disruption). Such an arrangement may provide a continuous scenario to customers, and may permit presentation of rapidly correlated information regarding planned maintenance events.

Interactive query logic 1110 may receive a customer maintenance event selection 1150, and may display additional information for the selected maintenance event in real time (as indicated by reference number 1160). In one implementation, interactive query logic 1100 may permit a customer to select a maintenance event, and/or may provide additional information regarding the latest status of the selected maintenance event to the customer.

Customer identifier 1120 may include any mechanism used to identify a customer. For example, in one implementation, dashboard web server 140 may incorporate systems that include different customer identifiers (e.g., corporate identifications (IDs), billing account numbers, Network Application Service Provider (NASP) IDs, subNASP IDs, Domain Name System (DNS) short names, etc.). In other implementations, custom identifier 1120 may include other mechanisms used to identify customers (e.g., stock symbols, tax identifications, etc.).

Customer products 1130 may include information related to any inventory (e.g., any circuit, device, node, etc.), any service (e.g., toll free phone numbers, digital subscriber line (DSL) services, etc.), etc. associated with a customer's one or more networks.

In one implementation, displaying visual indicators for maintenance events status 1140 may include displaying the colored icons (e.g., red, yellow, and/or green) described above. In other implementations, displaying visual indicators for maintenance events status 1140 may include displaying the elements described above in connection with FIGS. 8A and 8B (e.g., scheduled maintenance event 815, in progress maintenance event 820, etc.).

In one implementation, customer maintenance event selection 1150 may include selecting a maintenance event (e.g., scheduled maintenance event 815) with selection mechanism 845, as described above in connection with FIG. 8B. In other implementations customer maintenance event selection 1150 may include selecting a maintenance event via other mechanisms (e.g., via keyboard input, etc.).

In one implementation, displaying additional information for the selected maintenance event 1160 may include displaying a window (e.g., window 850) described above in connection with FIG. 8B. In other implementations, displaying additional information for the selected maintenance event 1160 may include displaying the information described above in connection with FIGS. 9 and 10.

In one implementation, dashboard web server 140 may use customer identifier 1120 and the associated customer products 1130 to provide any services described above as being provided by dashboard web server 140. For example, dashboard web server 140 may use customer identifier 1120 and the associated customer products 1130 to provide any of the user interfaces described above in connection with FIGS. 4-7. If a customer logs into dashboard web server 140 (e.g., via the login page of user interface 400), dashboard web server 140 may associate the customer with customer identifier 1120, and may display the associated customer products 1130 (e.g., circuits, devices, alarms, maintenance events) to the customer via user interfaces 400-700, as described above in connection with FIGS. 4-7.

Although FIG. 11 shows exemplary functional components of dashboard web server 140, in other implementations, dashboard web server 140 may contain fewer, different, or additional functional components than depicted in FIG. 11. In still other implementations, one or more functional components of dashboard web server 140 may perform one or more of the tasks performed by one or more other functional components of dashboard web server 140.

Figure 12:
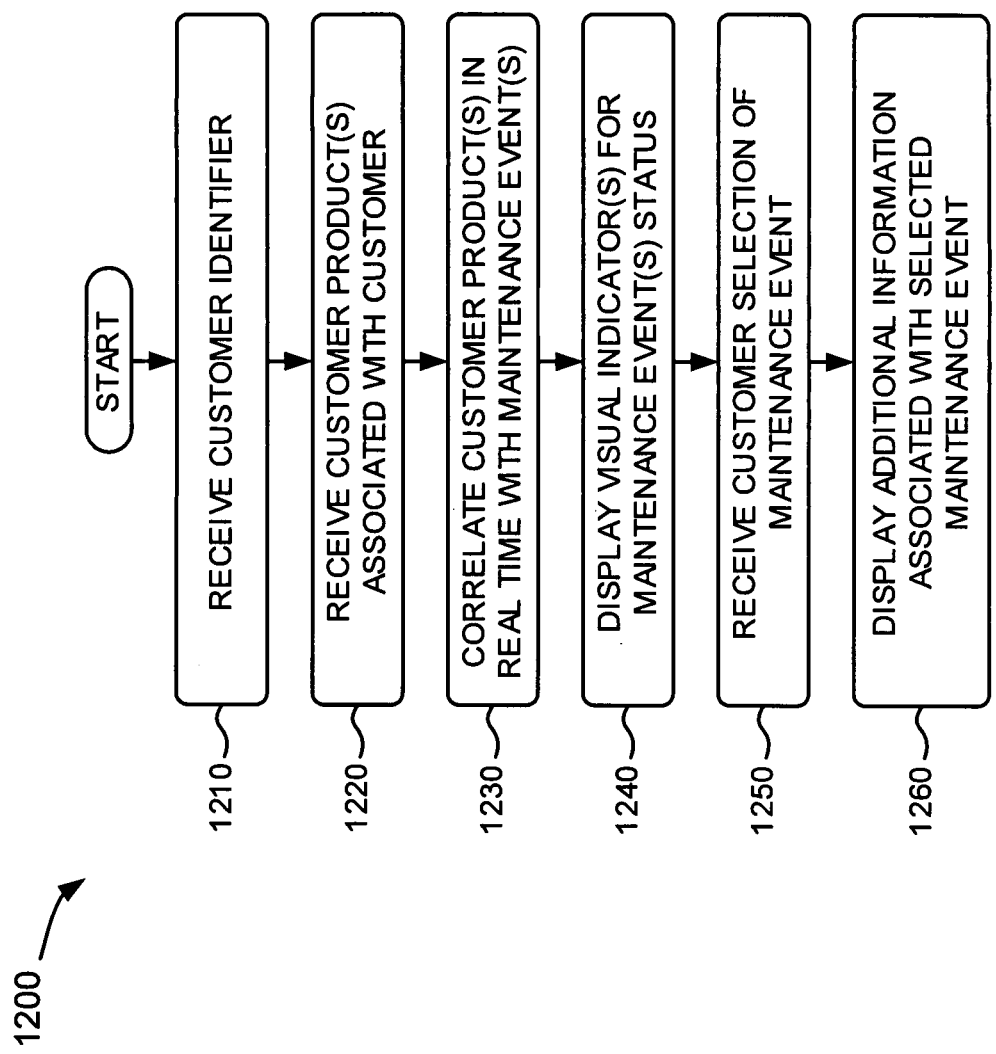
FIG. 12 depicts a flow chart of an exemplary process for providing a dashboard maintenance/outage correlation according to implementations described herein.

FIG. 12 depicts a flow chart of an exemplary process 1200 for providing a dashboard maintenance/outage correlation according to implementations described herein. In one implementation, process 1200 may be performed by dashboard web server 140. As illustrated, process 1200 may begin with receipt of a customer identifier associated with a customer (block 1210), and receipt of one or more customer products associated with the customer (block 1220). For example, in one implementation described above in connection with FIG. 11, schedule maintenance events logic 1100 of dashboard web server 140 may receive customer identifier 1120 and/or one or more customer products 1130.

As further shown in FIG. 12, the one or more customer products may be correlated in real time with one or more maintenance events (block 1230), and one or more visual indicators may be displayed and may indicate the status of the one or more maintenance events (block 1240). For example, in one implementation described above in connection with FIG. 11, schedule maintenance events logic 1100 may correlate or match customer products 1130, in real time, with maintenance events associated with customer products 1130. Schedule maintenance events logic 1100 may use the correlation, in real time, to display visual indicators of the status of maintenance events associated with customer products 1130 (as indicated by reference number 1140). In one example, schedule maintenance events logic 1100 may display a colored icon for a current status of an approved maintenance event (e.g., a yellow icon for approved and pending maintenance events, a red icon for occurring maintenance events, and/or a green icon for completed maintenance events).

As also shown in FIG. 12, a selection of a maintenance event may be received from the customer (block 1250), and additional information associated with the selected maintenance event may be displayed (block 1260). For example, in one implementation described above in connection with FIG. 11, interactive query logic 1110 of dashboard web server 140 may receive customer maintenance event selection 1150, and may display additional information for the selected maintenance event in real time (as indicated by reference number 1160). In one example, interactive query logic 1100 may permit a customer to select a maintenance event, and/or may provide additional information regarding the latest status of the selected maintenance event to the customer. In another example, displaying additional information for the selected maintenance event 1160 may include displaying a window (e.g., window 850) described above in connection with FIG. 8B. In still another example, displaying additional information for the selected maintenance event 1160 may include displaying the information described above in connection with FIGS. 9 and 10.

Figure 13:
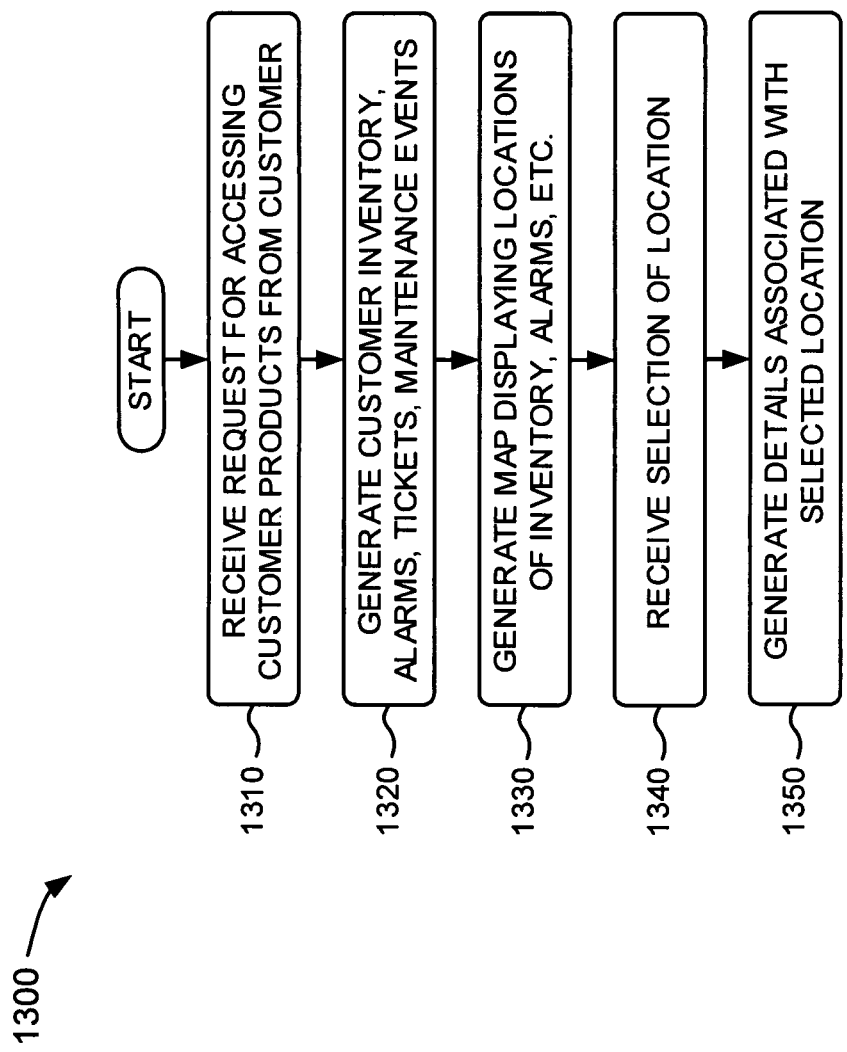
FIG. 13 depicts a flow chart of an exemplary process for providing a dashboard according to implementations described herein.

FIG. 13 depicts a flow chart of an exemplary process 1300 for providing a dashboard according to implementations described herein. In one implementation, process 1300 may be performed by dashboard web server 140. As illustrated, process 1300 may begin with receipt of a request for accessing one or more customer products from a customer (block 1310). For example, in one implementation described above in connection with FIG. 4, a customer may request access to one or more customer products by accessing dashboard-related pages via the login page of user interface 400. If a customer successfully logs into dashboard web server 140 (e.g., via input of correct information into user ID field 410 and password field 420 of the login page), user interface 400 (e.g., via dashboard web server 140) may present the dashboard summary page shown in FIG. 4.

As further shown in FIG. 13, inventory, alarms, tickets, maintenance events, etc. associated with the customer may be generated (block 1320), and a map displaying locations of the inventory, alarms, tickets, maintenance events, etc. may be generated (block 1330). For example, in one implementation described above in connection with FIG. 4, dashboard web server 140 may display the dashboard summary page of user interface 400. The dashboard summary page may display information related to network alarms (e.g., network alarms section 440), tickets (e.g., tickets section 450), locations/topography of inventory (e.g., locations/topography section 460), etc. that may be associated with the customer who logged in via the login page of user interface 400. In another implementation described above in connection with FIG. 5, dashboard web server 140 may display the dashboard console page of user interface 500. The dashboard console page may provide a network availability section 510, an alarms/ticketing section 520, a locations/topography section 530, a tickets performance breakout section 540, a network alarms section 550, and/or a tickets section 560. Locations/topography section 530 may provide a visual display (e.g., a map) of locations of inventory items of the customer's network, and/or any alarms and/or tickets associated with the customer's inventory items.

Returning to FIG. 13, a selection of a location on the map may be received (block 1340), and details associated with the selected location may be generated (block 1350). For example, in one implementation described above in connection with FIG. 5, a customer may select one of the locations of the inventory items provided by the map in locations/topography section 530, and dashboard web server 140 may display additional details about the selected location. For example, if the customer selected the location of the alarm in Texas, dashboard web server 140 may provide information such as the duration of the alarm, any tickets associated with the alarm, the device or devices associated with the alarm, etc.

Implementations described herein may include systems and methods that provide a dashboard for presentation and/or mapping of a customer's inventory and any alarms, tickets, and/or maintenance events associated with the customer's inventory. For example, in one implementation, the systems and methods may provide a dashboard maintenance/outage correlation that correlates one or more customer products (e.g., inventory, tickets, alarms, etc.) in real time for one or more maintenance events, and/or displays one or more visual indicators for the one or more maintenance events. The dashboard maintenance/outage correlation may receive a customer selection of a maintenance event, and/or may display additional information associated with the selected maintenance event.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 12 and 13, the order of the acts may be modified in other implementations. Further, non-dependent acts may be performed in parallel.

Also, the terms "user" and "customer" have been used herein. The terms "user" and "customer" are intended to be broadly interpreted to include a client (e.g., client 110) or a user or customer of a client.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device and via a network, information identifying a plurality of products associated with a customer of the network and provided by the network;
   receiving, by the computing device and via the network, an identifier associated with the customer;

associating, by the computing device, the information identifying the plurality of products with a plurality of maintenance events based on the identifier associated with customer;

displaying, by the computing device and in real time, a first screenshot that includes a visual indicator, for each of the plurality of maintenance events, indicating a status of each of the plurality of maintenance events that are associated with a corresponding one of the plurality of products, at least one of the visual indicators comprising one of a colored icon or a shaped icon and at least one of the colored icon or the shaped icon being based on the status of the corresponding one of the plurality of maintenance events;

receiving, by the computing device, a first selection of at least one of the visual indicators;

displaying, by the computing device and based on receiving the first selection, first information, related to the selected at least one of the visual indicators, in the first screenshot;

receiving, by the computing device, a second selection of the at least one of the visual indicators; and displaying, by the computing device and based on receiving the second selection, a second screenshot that includes second information related to the selected at least one of the visual indicators, the second information being different than the first information.

2. The method of claim 1, where at least one of the visual indicators includes maintenance scheduling and tracking information.

3. The method of claim 1, where receiving an identifier comprises:
receiving, as the identifier, at least one of a corporate identification, a billing account number, a Network Application Service Provider (NASD) identification, a subNASP identification, a Domain Name System (DNS) short name, a stock symbol, or a tax identification associated with the customer.

4. The method of claim 1, where receiving information identifying a plurality of products comprises:
receiving at least one of information associated with a circuit, information associated with a device, information associated with a node, or information associated with a service provided by the network for use by the customer.

5. The method of claim 1, where associating the information identifying the plurality of products comprises:
associating each of the plurality of maintenance events with a corresponding one of the plurality of products.

6. The method of claim 1, further comprising:
receiving a selection of the information related to the selected at least one of the visual indicators; and
displaying, based on receiving the selection of the information, additional information associated with the selected information.

7. The method of claim 1, further comprising:
receiving, from the customer, a request for accessing the information identifying the plurality of products; and
generating, based on the request, at least one of customer inventory, alarms, tickets, or maintenance events associated with the network.

8. The method of claim 7, where receiving a request comprises:
receiving a customer identification and a customer password.

9. The method of claim of claim 7, where generating, based on the request, at least one of customer inventory, alarms, tickets, or maintenance events associated with the network comprises at least one of:
generating information associated with at least one of a circuit, a device, or a service provided by the network;
generating an alarm associated with at least one of a circuit, a device, or a service provided by the network;
generating a ticket to address a problem associated with at least one of a circuit, a device, or a service provided by the network; or
generating a maintenance event to perform maintenance on at least one of a circuit, a device, or a service provided by the network.

10. The method of claim 7, further comprising:
generating, based on the request, a map displaying locations of at least one of the customer inventory, the alarms, the tickets, or the maintenance events associated with the network.

11. The method of claim 10, further comprising:
receiving a selection of a location on the map; and
displaying details associated with the selected location.

12. The method of claim 10, where generating the map comprises:
displaying, on the map, symbols with unique shapes and color coding that correspond to the at least one of the customer inventory, the alarms, the tickets, or the maintenance events.

13. A system, comprising:
one or more devices to:
receive, via network, information identifying a plurality of products associated with a customer of the network and provided by the network,
receive, via the network, an identifier associated with the customer,
display information identifying at least one of the plurality of products,
associate the at least one of the plurality of products with a maintenance event based on the identifier associated with the customer,
display, in real time, a first screenshot that includes a visual indicator indicating a status of the maintenance event, the visual indicator comprising one of a colored icon or a shaped icon and at least one of the colored icon or the shaped icon is based on the status of the corresponding maintenance event;
receive a first selection of the visual indicator;
display, based on receiving the first selection, first information, related to the selected at least one of the visual indicators, in the first screenshot;
receive a second selection of the at least one of the visual indicators; and
display, based on receiving the second selection, a second screenshot that includes second information related to the selected visual indicator, the second information being different than the first information.

14. The system of claim 13, where the visual indicator includes maintenance scheduling and tracking information.

15. The system of claim 14, where the identifier comprises at least one of a corporate identification, a billing account number, a Network Application Service Provider (NASP) identification, a subNASP identification, a Domain Name System (DNS) short name, a stock symbol, or a tax identification associated with the customer.

16. The system of claim 13, where the information identifying the at least one product comprises at least one of information associated with a circuit, information associated with a device, information associated with a node, or information associated with a service provided by the network for use by the customer.

17. The system of claim 13, where
a first colored icon indicates that the maintenance event is complete.

18. The system of claim 17, where second colored icon indicates that the maintenance event is scheduled, and a third colored icon indicates that the maintenance event is in progress.

19. The system of claim 13, where the one or more devices are further to:
display a particularly shaped icon, of a plurality of shaped icons, based the status of the maintenance event.

20. The system of claim 13, where the one or more devices are further to:
receive, from the customer, a selection of the information related to the selected visual indicator; and
display, based on receiving the selection of the information, additional information associated with the selected information.

21. The system of claim 20, where the selection of the maintenance event includes at least one of a mouse over selection or a point and click selection.

22. The system of claim 20, where the additional information includes at least one of location information associated with the selected maintenance event, product information associated with the selected maintenance event, scheduling information associated with the selected maintenance event, identification information associated with the selected maintenance event, or status information associated with the selected maintenance event.

23. A non-transitory computer-readable medium containing instructions comprising:
one or more instructions which, when executed by at least one processor, cause the at least one processor to receive, via a network, information identifying a plurality of products associated with a customer of a network and provided by the network;
one or more instructions which, when executed by the at least one processor, cause the at least one processor to receive, via the network, an identifier associated with the customer;
one or more instructions which, when executed by the at least one processor, cause the at least one processor to associate the plurality of products with a plurality of maintenance events based on the identifier associated with customer;
one or more instructions which, when executed by the at least one processor, cause the at least one processor to display, in real time a first screenshot that includes a visual indicator, for each of the plurality of maintenance events, indicating a status of each of the plurality of maintenance events associated with a corresponding one of the plurality of products, at least one of the visual indicators comprising one of a colored icon or a shaped icon and at least one of the colored icon or the shaped icon is based the status of the corresponding one of the plurality of maintenance events;
one or more instructions which, when executed by the at least one processor, cause the at least one processor to receive a first selection of the visual indicator;
one or more instructions which, when executed by the at least one processor, cause the at least one processor to display, based on receiving the first selection, first information, related to the selected at least one of the visual indicators, in the first screenshot;
one or more instructions which, when executed by the at least one processor, cause the at least one processor to receive a second selection of the at least one of the visual indicators; and
one or more instructions which, when executed by the at least one processor, cause the at least one processor to display, based on receiving the second selection, a second screenshot that includes information related to the selected visual indicator, the second information being different than the first information.

* * * * *